US005872997A

United States Patent [19]
Golson

[11] Patent Number: 5,872,997
[45] Date of Patent: Feb. 16, 1999

[54] SYSTEM FOR DYNAMICALLY DETERMINING MOTION AND RECONNECT THRESHOLDS OF A STORAGE MEDIA BASED ON THE EFFECTIVE TRANSFER RATE

[75] Inventor: Bradford E. Golson, Boulder, Colo.

[73] Assignee: Exabyte Corporation, Boulder, Colo.

[21] Appl. No.: 800,394

[22] Filed: Feb. 14, 1997

[51] Int. Cl.[6] .................................................. G06F 13/00
[52] U.S. Cl. ........................ 395/872; 395/880; 360/74.1
[58] Field of Search ............................ 395/821; 370/236, 370/412

[56] References Cited

U.S. PATENT DOCUMENTS

| 4,769,811 | 9/1988 | Eckberg, Jr. et al. | 370/236 |
| 5,142,422 | 8/1992 | Zook et al. | 360/54 |
| 5,541,912 | 7/1996 | Choudhury et al. | 370/412 |

FOREIGN PATENT DOCUMENTS

| 95/13607 | 5/1995 | WIPO . |
| 95/13615 | 5/1995 | WIPO . |

OTHER PUBLICATIONS

Golson, "Setting the Motion and Reconnect Thresholds", Aug. 12, 1991, pp. 1–13.

*Primary Examiner*—Thomas C. Lee
*Assistant Examiner*—Anderson I. Chen
*Attorney, Agent, or Firm*—Nixon & Vanderhye, P.C.

[57] ABSTRACT

A processor (50) is connected to use information supplied by a SCSI controller (32) and a buffer manager (36) to dynamically determines a motion threshold and a reconnect threshold for a buffer memory (56) of a SCSI target device, such as a magnetic tape drive (30). The motion threshold is utilized in comparison with a buffer fill level pointer to determine when transport of the storage media (31) is to be restarted. The reconnect threshold is utilized in comparison with the buffer fill level pointer to determine when the target device can reconnect to the SCSI bus (20).

18 Claims, 4 Drawing Sheets

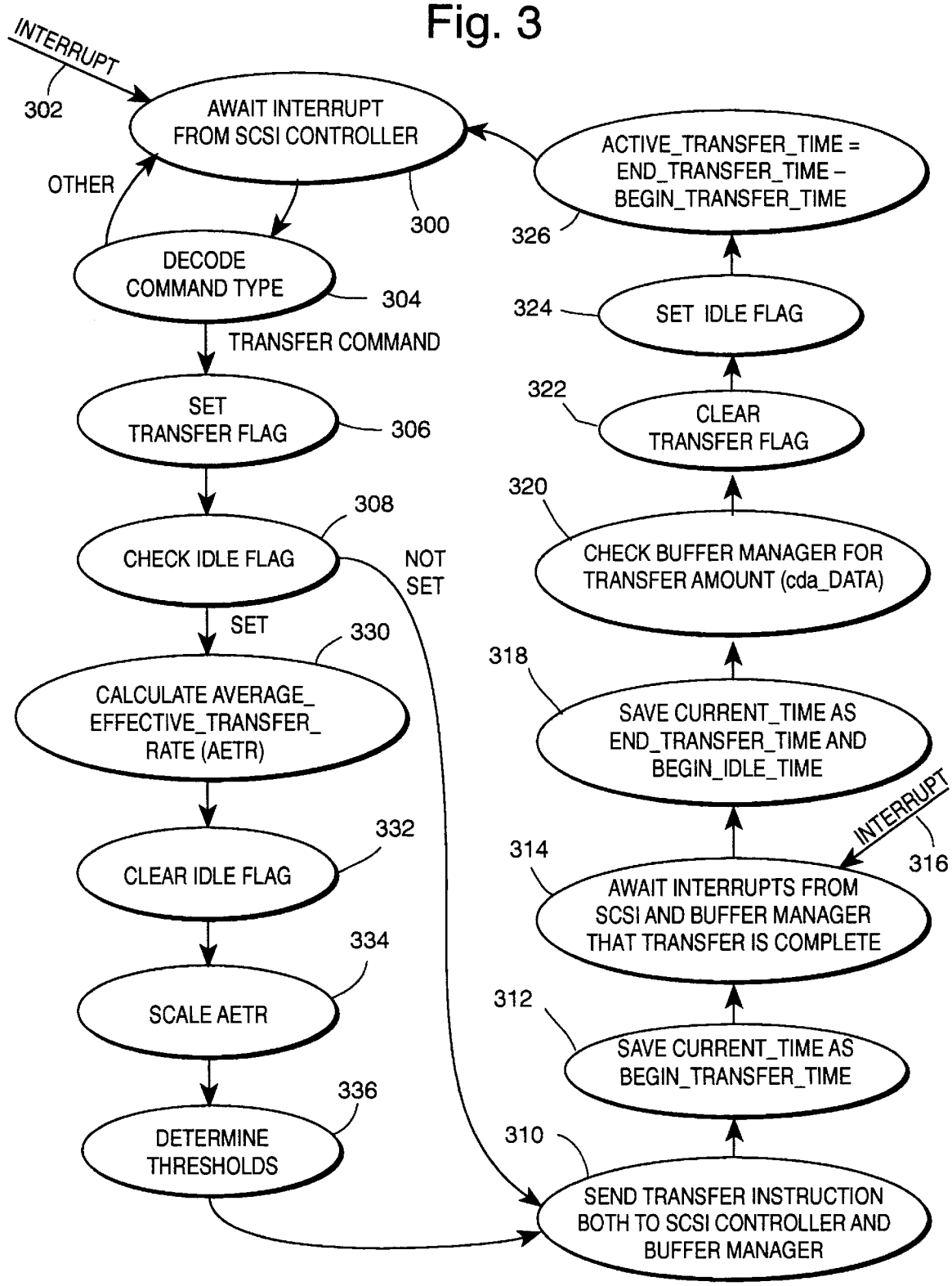

SYSTEM FOR DYNAMICALLY DETERMINING MOTION AND RECONNECT THRESHOLDS OF A STORAGE MEDIA BASED ON THE EFFECTIVE TRANSFER RATE

BACKGROUND

1. Field of Invention

This invention pertains to operation of target devices which store information on a storage media and which are connected to a SCSI bus, and particularly to the setting of buffer thresholds for such target devices.

2. Related Art and Other Considerations

For decades magnetic tape has been employed as a medium for storing information. Devices known as tape drives, tape decks, or tape recorders perform input and output operations, e.g., reading and recording operations, by transducing information from and to the tape. Information to be stored on a tape is obtained from a host device such as a computer. The information is transmitted from the host over a special connection or bus to the tape drive. Internally the tape drive has a buffer memory for storing information obtained from the host which the drive is not quite ready to record on the tape. When the information is ready to be recorded, the information passes through a write channel of the tape drive to a head. The head has gaps or other appropriate elements thereon which form magnetic flux transitions on the tape in the recording operation.

A reading operation for a tape drive is essentially the reverse of the recording operation. In the reading operation, the head detects magnetic flux transitions on the tape to obtain a read signal, processes the read signal in read circuitry, stores information ascertained from the read circuitry in the buffer, and ultimately transmits the information to a utilization device, e.g., the host, over the bus which connects the host and the tape drive.

One form of bus and interface connection between the host and tape drives has been standardized and is known as SCSI. The SCSI includes a SCSI controller integrated circuit (IC) which is resident in the tape drive and which is used to facilitate communications over a multi-bit SCSI bus. The SCSI bus includes data lines, power lines, ground lines, sensor lines, signaling lines, and control lines. The protocol for the SCSI bus is mandated by ANSI Standard X3.131-199x. The SCSI bus carries command description blocks (CDBs), two of the CDBs being data transfer from the host to the drive (data out) and data transfer from the drive to the host (data in). The time required for a CDB includes not only the time in which data is transferred, but also a certain overhead time.

When reading or recording (e.g., writing) data, a tape device can operate either as a streaming or start/stop tape device, depending on the data transfer rate of the host system. In the streaming mode the tape drive transfers data continuously (to tape or to the host) without stopping tape motion. In the start/stop mode, if the host system fails to transfer data to the tape drive quickly enough, the tape drive stops and restarts tape motion to accommodate a slow host transfer rate.

As mentioned above, tape drives typically have a memory known as a data buffer placed between the host system's data stream and the tape drive's recording and reading channels. In a recording operation, the level of data obtained from the host and transferred into the buffer must exceed a "motion" threshold before the tape drive initiates recording (e.g., movement of the tape and output of data through the recording channel). Similarly, in the recording operation, if the buffer is filling to rapidly with data from the host, the tape drive must stop receiving data from the host until the level of data in the buffer falls below a "reconnect" threshold. Conversely, in a reading operation, if the host can accept data from the tape drive's buffer faster than the tape drive can fill the buffer with data from the tape, the tape drive disconnects from the SCSI bus until the tape drive has filled its buffer back up to a level equal to the reconnect threshold. If, in a read operation, the tape drive fills the buffer with data from the tape, the tape drive must stop the tape and wait for the host to accept enough data to empty the buffer to the motion threshold, so that the tape drive can again start movement of the tape. Proper settings of the motion threshold and reconnect threshold can make a data buffer appear much larger than it really is, but improper settings have exactly the opposite effect.

Calculations for determination of static motion and reconnect thresholds were proposed in connection with a particular tape drive, i.e., an 8 mm helical scan tape drive model EXB-8500 marketed by Exabyte Corporation, in a document entitled "Setting The Motion and Reconnect Thresholds". That document sought to provide a tape drive operator with an approach for a one-time determination of the motion and reconnect thresholds. According to this static approach, a constant effective transfer rate for the tape drive/host combination was determined. By comparison with standard motion and reconnect thresholds for a 500 Kbyte/second transfer rate, the operator was to use the calculated constant effective transfer rate to adjust the static motion and reconnect thresholds of his particular drive.

Determination of static motion and reconnect thresholds as described above involved numerous assumptions and, as mentioned, resulted from a calculation of a constant effective transfer rate. For example, an assumption would have to be made regarding the size of blocks and the number of blocks transferred per CDB. Moreover, it was assumed that command overhead was a constant (i.e., fifteen milliseconds per CDB). Not only were the assumptions static, but other complicating factors were not considered. For example, the effective transfer rate cannot be considered constant when the drive employs data compression and there are variations in data compression ratios. Moreover, a SCSI bus can connect more than one host and one tape drive. As many as eight devices—at least one host and at least one drive—can be connected to a SCSI bus. When the connections of hosts and drives to a SCSI bus are changing, the data transfer rate to a particular drive is radically affected. These factors render static determinations of motion and reconnect thresholds less reliable and unrealistic.

As understood from the foregoing, inaccurately set motion and reconnect thresholds increase the number of tape start and stop operations. Increases in the number of tape start and stop operations not only decreases the tape drive's overall throughput and efficiency, but also increases wear of the drive's mechanical components and of the tape.

According, what is needed, and an object of the present invention, is dynamic motion and reconnect threshold management for a tape drive.

SUMMARY

A processor of a SCSI target device is connected to a SCSI controller and to a buffer manager. The processor dynamically determines a motion threshold and a reconnect threshold for a buffer memory in which user data is stored either preparatory to recording on a storage media or preparatory for transmission to a host. The motion threshold is utilized in comparison with a buffer fill level pointer to determine when transport of the storage media is to be restarted. The reconnect threshold is utilized in comparison with the buffer fill level pointer to determine when the target device can reconnect to the SCSI bus. In one embodiment, the SCSI target device is a magnetic tape drive.

In determining the motion threshold and the reconnect threshold, the processor determines an effective transfer rate by dividing a quantity of transferred data by a total transfer time. The quantity of transferred data is obtained from the buffer manager, and is an actual count of transferred bytes which considers any data compression or decompression. The total transfer time is a sum of an active transfer time of user data associated a SCSI transfer command descriptor block (CDB), e.g., either a write CDB or a read CDB, and an idle time between transfers of user data.

In a write mode, the active transfer time is measured from when (1) the processor, in response to receipt of a write command descriptor block (CDB), initiates a transfer of user data between the SCSI controller and the buffer manager, until (2) the buffer manager apprises the processor that all user data corresponding to the write CDB has been stored in the buffer memory. In the write mode the idle time is measured from when (1) the buffer manager apprises the processor that all user data corresponding to the write CDB has been stored in the buffer memory, until (2) the processor is notified that a further write CDB is received on the SCSI bus.

In a read mode the active transfer time is measured from when (1) the processor, in response to receipt of a read command descriptor block (CDB), initiates a transfer of user data between the SCSI controller and the buffer manager, until (2) the SCSI controller apprises the processor that all user data corresponding to the read CDB has been transferred to the SCSI bus. In the read mode the idle time is measured from when (1) the SCSI controller apprises the processor that all user data corresponding to the read CDB has been transferred to the SCSI bus, until (2) the processor is notified that a further read CDB is received on the SCSI bus.

The processor determines an average effective transfer rate by averaging the effective transfer rates for a predetermined number of command descriptor blocks (CDBs), including a most recent CDB and a plurality of next previous CDBs.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view of actions preformed by a processor included in the tape drive of FIG. 1.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
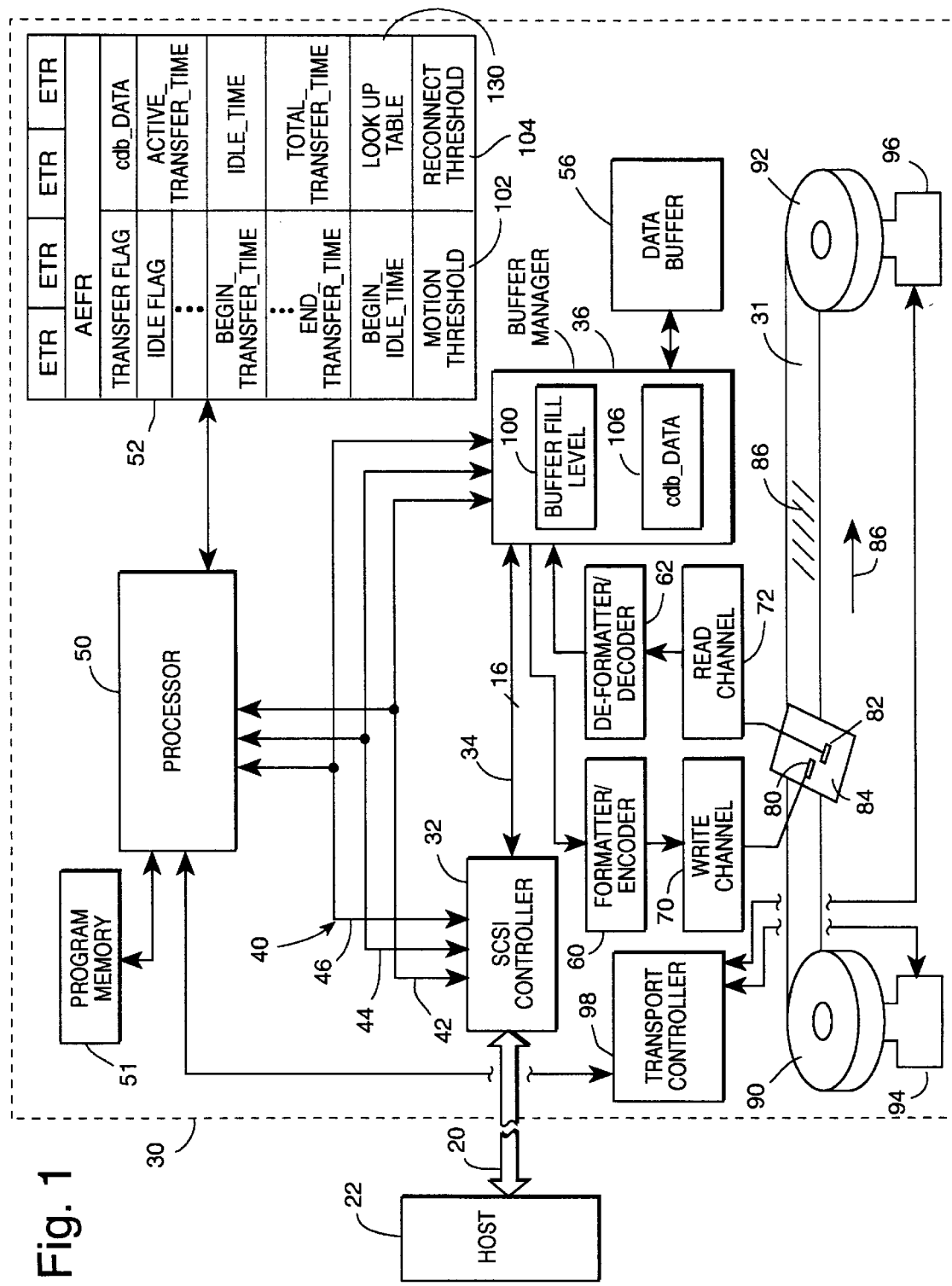
FIG. 1 is a schematic view of a tape drive according to the present invention connected to a host by a SCSI device.

FIG. 1 shows a SCSI bus 20 which connects a host computer 22 and a SCSI target storage device, particularly tape drive 30. In the illustrated embodiment, tape drive 30 is a helical scan tape drive such as a Mammoth™ tape drive manufactured by Exabyte Corporation which transduces information on/from 8 mm tape 31. However, it should be understood that the present device is not limited to a helical scan-type tape drive, but that other types of target devices, e.g., tape drives including serpentine tape drives, are also within the scope of the present invention.

Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Bus system 40 includes data bus 42; address bus 44; and control bus 46. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer memory 36 is also connected to formatter/encoder 60 and to deformatter/decoder 62. Formatter/encoder 60 and deformatter/decoder 62 are, in turn, respectively connected to write channel 70 and read channel 72. Write channel 70 is connected to one or more recording elements or write head(s) 80; read channel is connected to one or more read elements or read head(s) 82.

In the illustrated embodiment, write head(s) 80 and read head(s) 82 are situated on a peripheral surface of rotating drum 84. Tape 31 is wrapped around drum 84 such that head(s) 80 and 82 form helical stripes 86 on tape 31 as tape 31 is transported in a direction indicated by arrow 86 from a supply reel 90 to a take-up reel 92. Supply reel 90 and take-up reel 92 are typically housed in an unillustrated cartridge or cassette from which tape 31 is extracted into a tape path that includes wrapping around drum 84. Supply reel 90 and take-up reel 92 are driven by respective reel motors 94 and 96. Reel motors 94 and 96 are driven by transport controller 98, which ultimately is governed by processor 50. Operation and control of the tape transport mechanism including reel motors 94 and 96 is understood by the person skilled in the art, one example being shown in U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

SCSI bus 20 has a plurality of cables for carrying signals and data, all as prescribed by ANSI Standard X3.131-199x. For the present invention it is sufficient to understand that SCSI bus 20 has various information transfer phases, and that SCSI bus 20 carries commands in a COMMAND phase and user data in phases known as the DATA OUT and DATA IN phases. SCSI bus 20 can be in only one phase at a given time. Three of the cables included in SCSI bus 20 are control lines which are used indicate the present phase of SCSI bus 20, as explained with reference to Table 5-1 of ANSI Standard X3.131-199x.

At least eight, and in some versions more, of the cables in SCSI bus 20 are used for carrying a byte(s) of information in parallel. When in the command phase, the information carried on these eight or more cables are the contents of a command, more properly termed a command descriptor block (CDB). Each CDB has six bytes. The first byte of the CDB indicates the type of command, e.g., a write CDB or a read CDB. The third through fifth bytes of the CDB have stored therein a transfer amount, e.g., the number of bytes to be written in a write operation for a write CDB and the number of bytes to be read in a read operation for a read CDB.

After SCSI bus 20 is in a COMMAND phase for a write CDB, SCSI bus 20 next transitions to a DATA OUT phase and the eight or more information-carrying cables of SCSI bus 20 are used to transmit the number of bytes of information indicated by the CDE from host 22 to tape drive 30. Similarly, after SCSI bus 20 is in a COMMAND phase for a read CDB, SCSI bus 20 next transitions to a DATA IN phase and the eight or more information-carrying cables of SCSI bus 20 are used to transmit the number of bytes of information indicated by the CDB from tape drive 30 to host 20.

SCSI controller 32 is a commercially available integrated circuit which satisfies ANSI Standard X3.131-199x, and is available from numerous supplies. In essence, SCSI controller 32 is a state machine which generates interrupts to processor 50 on control bus 46 and which has a command code register into which processor 50 can load command codes. The command codes are transferred to SCSI controller 32 from processor 50 on data bus 42 to the register specified by the current value carried on address bus 44. SCSI controller 32 performs operations in accordance with the particular command codes loaded into its command code register by processor 50.

Tape drive 30, and particularly its SCSI controller 32, must have an address for SCSI bus 20. For the purpose of designating an address relative to SCSI bus 20, tape drive 30 has an unillustrated jumper switch which is manually set to a selected SCSI bus address value. Processor 50 reads the value of the jumper switch and ultimately programs the SCSI bus address value in SCSI controller 32. The SCSI bus address value enables SCSI controller 32 to know, during an arbitration phase, whether an ensuing command is for it or for another device connected to SCSI bus 20.

Buffer manager 36 is an integrated circuit which, in a write operation, basically transfers user data received from host 22 via SCSI controller 32 into buffer 56, and at the appropriate time transfers that user data from buffer 56 to formatter/encoder 60 so that the user data can be applied to write channel 70 and then recorded by write head(s) 80 on tape 31. In a read operation, user data obtained from tape 31 by read head(s) 82 and processed by read channel 72 and deformatter/decoder 62 is stored by buffer manager 36 in buffer 56. Then, at an appropriate time, in the read mode buffer manager 36 transfers that read user data from buffer 56 to host 22 via SCSI controller 32.

Buffer manager 36 is a state machine which has a command register into which command codes are loaded by processor 50, and other registers for data. The data in these registers can be data transmitted to buffer manager 36 by processor 50 on data bus 42, or can be intended for transfer from buffer manager 36 to processor 50. The address of the register in buffer manager 36 is specified by the current value on address bus 44.

Two values stored in RAM 52 are the MOTION THRESHOLD and the RECONNECT THRESHOLD, stored at locations depicted as 102 and 104, respectively. A BUFFER FILL LEVEL register 106 is maintained by buffer manager 36. As will be described subsequently in connection with FIG. 3, processor 50 dynamically computes the MOTION THRESHOLD and the RECONNECT THRESHOLD, so that updated values of the MOTION THRESHOLD and the RECONNECT THRESHOLD are stored when update is required in locations 102 and 104.

Program memory 51 has stored therein a set of coded instructions which are executed by processor 50. FIG. 3 shows operations performed by processor 50 in connection with the present invention. It should be understood that processor 50 performs many operations other than those illustrated in FIG. 3 in connection with control of tape drive 30, but for sake of clarity only those pertinent to the present invention are described herein.

Operation 300 of FIG. 3 shows processor 50 awaiting an interrupt from SCSI controller 32. When an interrupt indicative of receipt by SCSI controller 32 of a CDB is received on control bus 46 (as indicated by action 302), the CDB is forwarded to processor 50 over data bus 42. At operation 304 the CDB is decoded to determine (from its first byte) its command type. If the command type does not indicate either a write CDB or a read CDB, processor 50 returns to the await state depicted by operation 300.

When a read CDB or a write CDB is decoded, processor 50 sets a flag known as the TRANSFER FLAG at operation 306 to indicate that a data transfer is to occur. The TRANSFER FLAG, and other values handled by processor 50, are shown in FIG. 1 as being stored in RAM 52. Then, at operation 308, processor 50 checks a flag known as the IDLE FLAG. For the present, it is assumed that the IDLE FLAG is not set, so that execution continues with operation 310. Moreover, it is assumed below for present discussion that a write CDB has been received.

Since a write CDB has been received, SCSI controller 32 waits to transfer a prescribed number of bytes of user data from SCSI bus 20 over bus 34 to buffer manager 36. The prescribed number of bytes of user data to be transferred was specified in the third through fifth bytes of the write CDB. At operation 310, processor 50 sends a transfer instruction (e.g., command code) to both SCSI controller 32 and buffer manager 36, thereby allowing SCSI controller 32 to gate the user data on bus 34, and buffer manager 36 to process the user data and then store the user data in data buffer 56.

Immediately after the transfer instruction of operation 310, as reflected by operation 312 processor 50 checks its internal clock and saves the current time as a value known as BEGIN_TRANSFER_TIME.

In processing user data gated thereto by SCSI controller 32, buffer manager 36 can compress the user data using any of a plurality of conventional data compression schemes. In the illustrated embodiment, one such compression scheme developed by IBM Corporation is known as IDRC. Data compression, among other things, typically results in the amount of user data actually stored in data buffer 56 being different than the number of bytes specified in the write CDB.

FIG. 3 shows processor 50 (at operation 314) awaiting completion by buffer manager 36 of its processing of user data in route to buffer manager 56. When buffer manager 36 has stored all the user data received subsequent to write CDB in buffer 56, buffer manager 36 issues an interrupt on control bus 46 to processor 50. When such an interrupt (depicted by interrupt 316 in FIG. 3) is received by processor 50, processor 50 knows that the transfer to buffer 56 is completed and thereupon saves (in operation 318) the current time on its clock in both values known as END_TRANSFER_TIME and BEGIN_IDLE_TIME. Processor 50 then checks, at operation 320, a register 106 of buffer manager 36 into which buffer manager 36 has loaded its count of actual bytes transferred into buffer 56 in connected with the last write CDB. Processor 50 stores the count of actual bytes transferred as a value cdb_data.

Since the transfer into buffer 56 is completed, processor 50 clears the TRANSFER FLAG at operation 322. Completion of a transfer conversely means that tape drive 30 is idle with respect to transfer of user data between itself and host 20. Accordingly, at operation 324 processor 50 sets the IDLE FLAG. Then, at operation 326, processor 50 computes a value known as ACTIVE_TRANSFER_TIME. In particular, processor 50 determines ACTIVE_TRANSFER_TIME by subtracting the value of BEGIN_TRANSFER_TIME from the value of END_TRANSFER_TIME.

In the idle state, processor 50 then returns to operation 300 for awaiting another interrupt from SCSI controller 32. When processor 50 is interrupted with another write CDB, processor 50 sets the TRANSFER FLAG (at operation 306) and checks the value of the IDLE FLAG (at operation 308). Since the IDLE FLAG is now set (see preceding discussion of operation 324), operation 330 is next preformed.

Figure 3A:
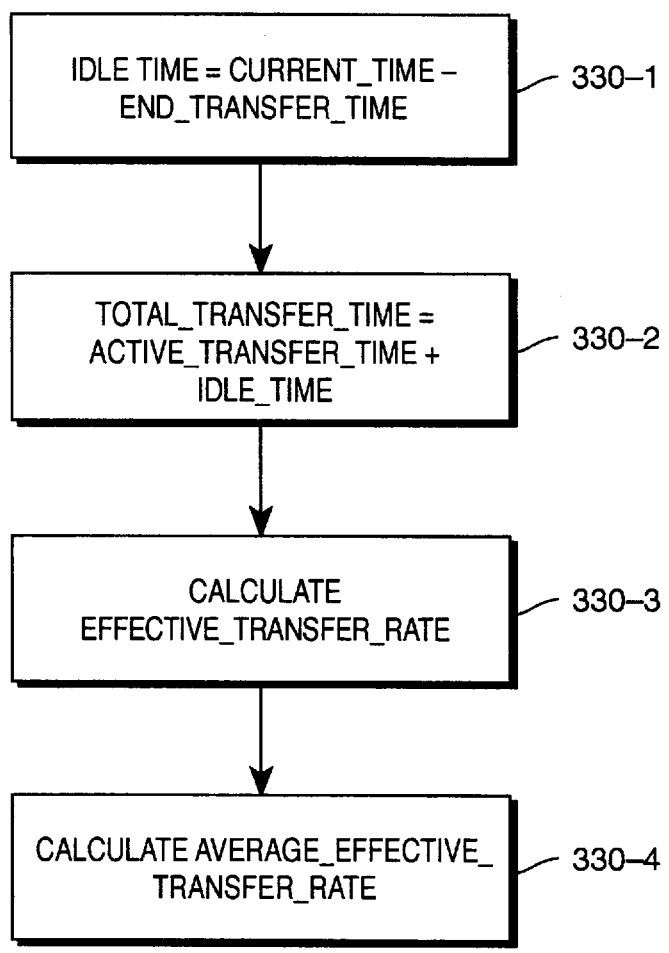
FIG. 3A is a schematic view-of detailed steps of a "calculate average effective transfer rate" action of FIG. 3.

Operation 330 involves calculating a value known as the AVERAGE_EFFECTIVE_TRANSFER_RATE. Steps involved in operation 330 for calculating the AVERAGE_EFFECTIVE_TRANSFER_RATE are shown in FIG. 3A. At step 330-1, processor 50 checks its clock to determine the current time (CURRENT_TIME), and then computes a value known as IDLE_TIME by subtracting the value of END_TRANSFER_TIME (see operation 318) from the current time. Then, at step 330-2, processor 50 determines a value known as TOTAL_TRANSFER_TIME by adding the values of ACTIVE_TRANSFER_TIME (see operation 326) and IDLE_TIME (see step 330-1). At step 330-3, processor 50 calculates a value known as EFFECTIVE_TRANSFER_RATE (ETR) by dividing the value of cdb_data by the value of TOTAL_TRANSFER_TIME. The value of cdb_data was obtained from buffer manager 36 at operation 320; the value of TOTAL_TRANSFER_TIME was determined at step 330-2.

Step 330-4 involves determining an AVERAGE_EFFECTIVE_TRANSFER_RATE (AEFR). The AVERAGE_EFFECTIVE_TRANSFER_RATE (AEFR) is determined by averaging the ETR just obtained at step 330-3 with a plurality of next-previous ETRs calculated by processor 50. In the illustrated embodiment, RAM 52 maintains a window of four ETR values (the most recent and three next previous ETR values) from which the AVERAGE_EFFECTIVE_TRANSFER_RATE (AEFR) is computed.

After the AVERAGE_EFFECTIVE_TRANSFER_RATE (AEFR) is determined in operation 330, the IDLE FLAG is cleared by processor 50 in operation 332. In operation 334, the AVERAGE_EFFECTIVE_TRANSFER_RATE (AEFR) is scaled by a factor of two to increase granularity for a look up operation to be performed in operation 336. Look up operation 336 is performed in LOOK UP TABLE 130 of RAM 52 using the AVERAGE_EFFECTIVE_TRANSFER_RATE (AEFR) value to index into LOOK UP TABLE 130. The contents of LOOK UP TABLE 130 are depicted by TABLE 1. In TABLE 1, "MB/S" means megabyte per second; the number s in the two threshold columns are hexadecimal values.

TABLE 1

| AVERAGE_EFFECTIVE_TRANSFER_RATE (AETR) | MOTION THRESHOLD | RECONNECT THRESHOLD |
|---|---|---|
| <1 MB/S | D0 | 20 |
| 1 to 1.49 MB/S | D0 | 20 |
| 1.5 to 1.99 MB/S | D0 | 20 |
| 2 to 2.49 MB/S | B0 | 45 |
| 2.5 to 2.99 MB/S | 90 | 70 |
| 3 to 3.49 MB/S | 80 | 80 |
| 3.5 to 3.99 MB/S | 60 | A0 |
| 4 to 4.49 MB/S | 40 | C0 |
| 4.5 to 4.99 MB/S | 20 | D0 |
| 5.0 and >5.0 MB/S | 20 | D0 |

For the particular buffer 56 illustrated, standard default thresholds (e.g., threshold s utilized upon start-up) are set to the center of buffer 56, which is a hexidecimal value of 80 (e.g., 80h). Each 1h in TABLE 1 represents 0.39% of buffer 56 (e.g., 80h represents 50% of buffer 56).

For the Exabyte® Mammoth™ helical scan recorded illustrated in FIG. 1, the standard default thresholds are ideal for a host system which has an average effective transfer rate of 3 MB/S.

In consulting LOOK UP TABLE 130, processor 50 implements the logic described in this paragraph. For systems which have an effective transfer rate greater than 3 MB/S, the MOTION THRESHOLD should be lowered and the RECONNECT THRESHOLD should be raised. The RECONNECT THRESHOLD is adjusted in an opposite direction from the MOTION THRESHOLD. This has the effect of transferring more data during the motion sequence by starting the tape moving sooner and waiting longer before connecting to the faster data stream. For systems with an effective transfer rate less than 3 MB/S, the MOTION THRESHOLD should be raised and the RECONNECT THRESHOLD should be lowered. If a host system has an effective transfer rate greater than 4 MB/S, then the MOTION THRESHOLD should be set to 20h (the lowest possible value) and the RECONNECT THRESHOLD should be set to D0h (the highest possible value). For systems with an effective transfer rate below 2 MB/S, the MOTION THRESHOLD should be set to D0h (the highest possible value) and the RECONNECT THRESHOLD should be set to 20h (the lowest possible value).

Buffer manager 36 maintains the BUFFER FILL LEVEL pointer 100 and makes its value available to processor 50.

When processor 50 determines that the BUFFER FILL LEVEL has reached a value relative to either RECONNECT THRESHOLD or MOTION THRESHOLD that motion of tape 31 should be changed (e.g., a stopped tape started or a moving tape stopped), processor 50 so advises transport controller 98. Transport controller 98 then sends signals to appropriate one(s) of reel motor(s) 94 and 96 for either moving or stopping tape 31, as required under the circumstances.

In a streaming mode, tape drive 31 adapts to the host's data transfer rate by disconnecting from and reconnecting to SCSI bus 20. Tape drive 31 determines when to reconnect to the SCSI bus 20 by comparing how full the buffer is (the BUFFER FILL LEVEL) to the RECONNECT THRESHOLD. During a write operation, if buffer 56 fills with data from host 22 faster than tape drive 30 can record the data to tape 31, tape drive 30 disconnects from SCSI bus 20 while continuing to record user data on tape 31 until the amount of space in buffer 56 is equal to the RECONNECT THRESHOLD. Tape drive 30 then reconnecs to SCSI bus 20 to accept more user data.

During a stop/start mode, tape drive 30 adapts to the host's data transfer rate by starting and stopping the motion of tape 31. Tape drive 30 determines when to restart tape motion by comparing the BUFFER FILL LEVEL with the MOTION THRESHOLD. During a write operation, tape drive 31 waits until buffer 56 is filled to the level indicated by the MOTION THRESHOLD and only then starts movement of tape 31, records the user data from buffer 56, and then stops tape 31 until buffer 56 can be filled again to the MOTION THRESHOLD by host 22. During a read operation, tape drive 30 fills buffer 56 with user data from tape 31, stops tape 31, waits for host 22 to accept enough user data to empty buffer 56 to the MOTION THRESHOLD, and then starts motion of tape 31 to again fill buffer 56.

While the operations of processor 50 depicted in FIG. 3 have been described above in connection with a write mode, it should be understood that essentially the same operations are involved in a read mode. In the read mode, operation 310 involves processor 50 sending instructions to buffer manager 36 and SCSI controller 32 so that the amount of data specified in the read CDB is obtained from buffer 56 and transferred from buffer manager 36, to SCSI controller 32, and onto SCSI bus 20. In so doing, buffer manager 36 must decompress (when a compression is implemented) sufficient user data from buffer 56 in order to fulfill the amount of user data requested by the read CDB. In operations 314 and 316, the interrupt from SCSI controller 32 is determinative of the clock time to use for the values of END_TRANSFER_TIME and BEGIN_IDLE_TIME. In operation 320 buffer manager 36 provides the number of user data bytes which were transferred to SCSI bus 20.

Dynamically setting the RECONNECT THRESHOLD and the MOTION THRESHOLD allows usage of updated accurate parameters rather than stagnant estimates. Dynamic setting of the thresholds is particularly important in view of the fact that SCSI bus throughput is affected by diverse and variable parameters such as the total number of bytes transferred during each individual command (CDB); the size, number, and type of logical blocks transferred (fixed or variable); the SCSI bus data transfer protocol (asynchronous or synchronous); and, the SCSI bus data transfer rate (REQ/ACK period).

Moreover, the present invention takes into account variations in data compression rates in computing the RECONNECT THRESHOLD and the MOTION THRESHOLD.

By dynamically setting the RECONNECT THRESHOLD and the MOTION THRESHOLD, the present invention advantageously increases the effective size of buffer 56, which means that a smaller and less expensive memory can be used for buffer 56. Moreover, dynamically setting the RECONNECT THRESHOLD and the MOTION THRESHOLD results in fewer tape stop and tape start operations. A reduced number of tape stop and tape start operations increases the overall throughput of tape drive 30 (i.e., the speed of tape drive 30), and further serves to reduce wear of mechanical components of tape drive 30 and tape 31.

Figure 2A:
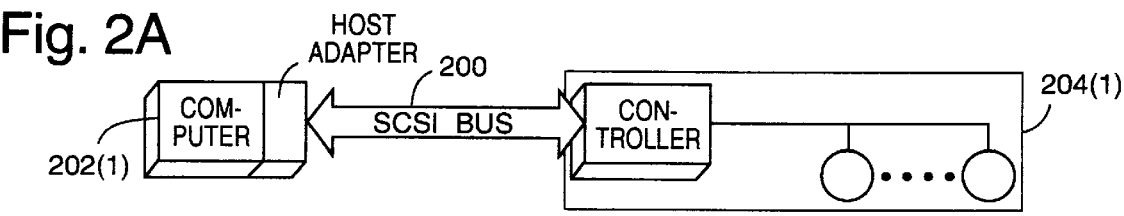
FIG. 2A is a schematic view illustrating the use of a SCSI bus to connect a single host and a single SCSI device.

In the prior art, the RECONNECT THRESHOLD and the MOTION THRESHOLD were established with respect to a single host. Whereas the invention has primarily been discussed in the context of a single host and a single tape drive (i.e., tape drive 30) in connection with FIG. 1, it should be understood that advantages of the present invention are even more pronounced in more complex configurations. The more complex configurations result from the fact that a SCSI bus can have as many as sixteen devices connected thereto, provided that at least one device is an initiator and at least one device is a target. The configuration of FIG. 2A is a more generic representation of the embodiment shown in FIG. 1, comprising a SCSI bus 200 which connects initiator 202(1) to target device 204(1) [which respectively correspond to host 22 and tape drive 30 of the FIG. 1 embodiment]. In FIG. 2A, the initiator 200(1) includes a computer and a host adapter, the host adapter being connected to SCSI bus 200. Target device 204(1) has shown as including a SCSI controller connected to SCSI bus 200.

Figure 2B:
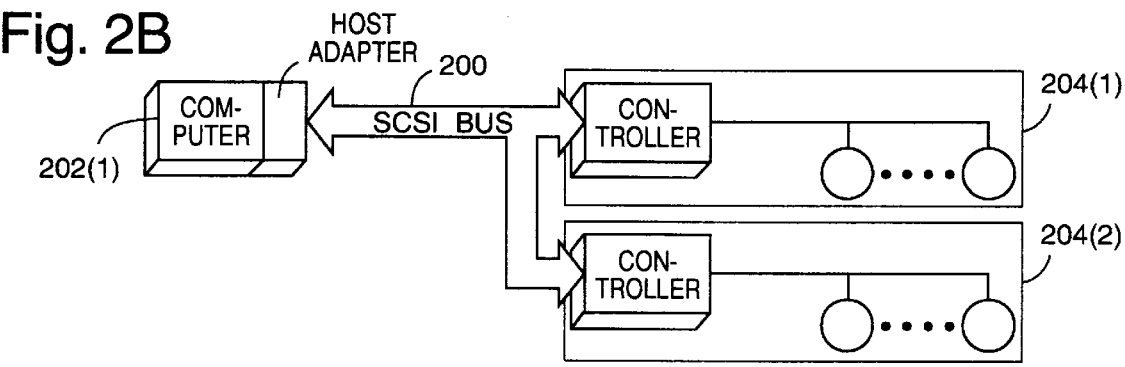
FIG. 2B is a schematic view illustrating the use of a SCSI bus to connect a single host and with two SCSI devices.
Figure 2C:
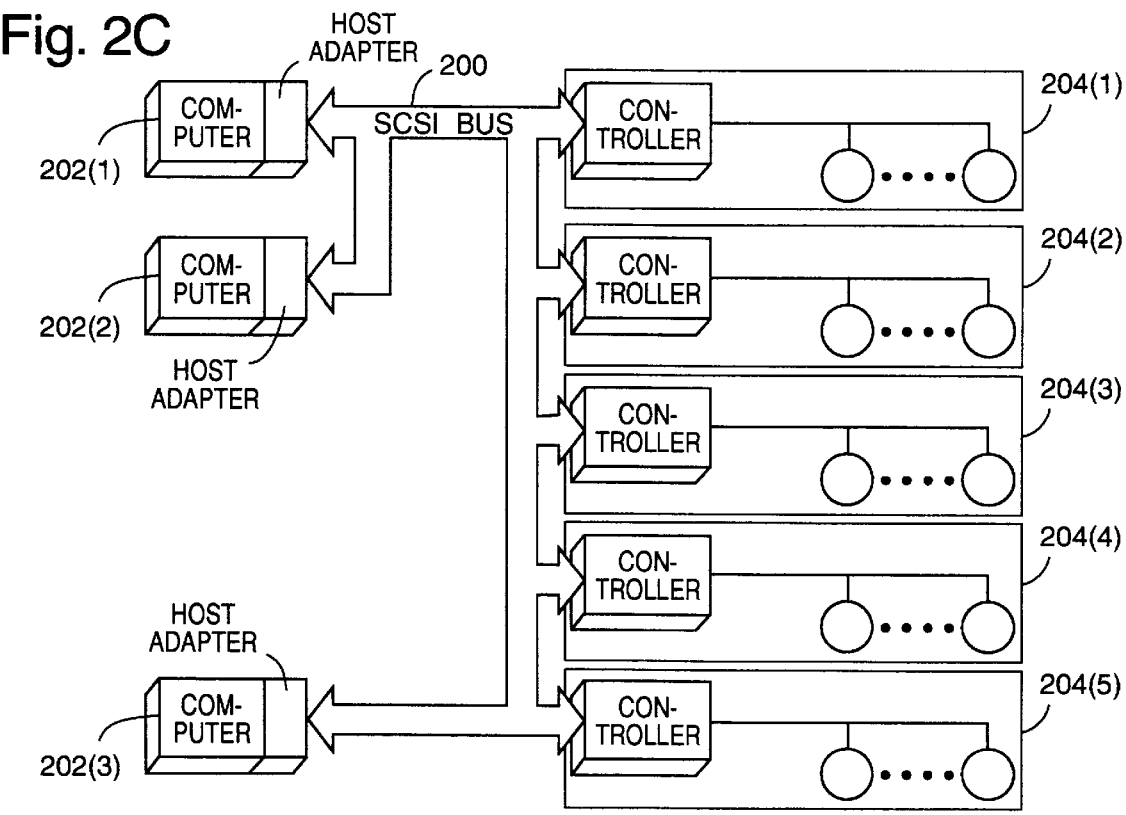
FIG. 2C is a schematic view illustrating the use of a SCSI bus to connect three hosts and a five SCSI devices.

FIG. 2B shows SCSI bus 200 connecting a single initiator 202(1) with two target devices 204(1) and 204(2). FIG. 2C shows SCSI bus 200 connecting three initiators 202(1)–202(3) with five target devices 204(1)–204(5). It should be understood that target devices 204 need not necessarily all be tape drives, but can instead be other peripheral devices such as printers, optical disk drives, and magnetic disk drives, for example.

The pronounced advantages in multihost (e.g., multi-initiator) configurations such as that described in FIG. 2C, e.g., two hosts sharing one tape drive, include setting the RECONNECT THRESHOLD and the MOTION THRESHOLD in accordance with whichever host is involved at the moment in data transfer to the target device. No longer are two hosts with different speeds forced to share the same threshold settings.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A target device which handles a storage media for the transducing information between the target device and the storage media, the target device comprising:

a SCSI controller which receives a transfer command is received on a SCSI bus;

a buffer memory in which user data is stored;

a transport system for transporting the storage media;

an element which transduces user data to the storage media as the storage media is transported by the transport system;

a buffer manager through which user data is transferred between the SCSI controller and the butler memory in response to the transfer command and which maintains a pointer indicative of a data fill level of the buffer;

a processor connected to the SCSI controller and to the buffer manager and which determines an effective transfer rate between the SCSI controller and the target device and which uses the effective transfer rate dynamically to determine at least one of a motion threshold and a reconnect threshold for the buffer memory for increasing throughput of the target device, the motion threshold being a value utilized in comparison with the pointer to determine when transport of the storage media is to be restarted, the reconnect threshold being a value utilized in comparison with the pointer to determine when the target device can reconnect to the SCSI bus.

2. The apparatus of claim 1, wherein the target device is a magnetic tape drive.

3. The apparatus of claim 1, wherein the processor determines the effective transfer rate by dividing a quantity of transferred data by a total transfer time, the total transfer time being a sum of an active transfer time and an idle time.

4. The apparatus of claim 3, wherein in a write mode the active transfer time is measured from when (1) the processor, in response to receipt of a write command descriptor block (CDB), initiates a transfer of user data between the SCSI controller and the buffer manager, until (2) the buffer manager apprises the processor that all user data corresponding to the write CDB has been stored in the buffer memory.

5. The apparatus of claim 4, wherein in the write mode the idle time is measured from when (1) the buffer manager apprises the processor that all user data corresponding to the write CDB has been stored in the buffer memory, until (2) the processor is notified that a further write CDB is received on the SCSI bus.

6. The apparatus of claim 3, wherein in a read mode the active transfer time is measured from when (1) the processor, in response to receipt of a read command descriptor block (CDB), initiates a transfer of user data between the SCSI controller and the buffer manager, until (2) the SCSI controller apprises the processor that all user data corresponding to the read CDB has been transferred to the SCSI bus.

7. The apparatus of claim 6, wherein in the read mode the idle time is measured from when (1) the SCSI controller apprises the processor that all user data corresponding to the read CDB has been transferred to the SCSI bus, until (2) the processor is notified that a further read CDB is received on the SCSI bus.

8. The apparatus of claim 3, wherein the processor determines an average effective transfer rate by averaging the effective transfer rates for a predetermined number of command descriptor blocks (CDBs), including a most recent CDB and a plurality of next previous CDBs.

9. A method of operating a target device which handles a storage media for the transducing information between the target device and the storage media, the method comprising:

(1) transporting the storage media past an element which transduces user data to or from the storage media;

(2) transferring user data between a SCSI controller and a buffer memory through a buffer manager in accordance with a transfer command received on a SCSI bus;

(3) using the buffer manager to maintain a pointer indicative of a data fill level of the buffer;

(4) determining an effective transfer rate between the SCSI controller and the target device and using the effective transfer rate dynamically to determine at least one of a motion threshold and a reconnect threshold for the buffer memory; and then performing one of the following:

(A) using the motion threshold in comparison with the pointer to determine when transport of the storage media is to be restarted;

(B) using the reconnect threshold in comparison with the pointer to determine when the target device can reconnect to the SCSI bus.

10. The method of claim 9, wherein the determination of step (4) is performed by a processor.

11. The method of claim 10, wherein in the determination of step (4) the processor determines the effective transfer rate by dividing a quantity of transferred data by a total transfer time, the total transfer time being a sum of an active transfer time and an idle time.

12. The method of claim 11, wherein in a write mode the active transfer time is measured from when (1) the processor, in response to receipt of a write command descriptor block (CDB), initiates a transfer of user data between the SCSI controller and the buffer manager, until (2) the buffer manager apprises the processor that all user data corresponding to the write CDB has been stored in the buffer memory.

13. The method of claim 12, wherein in the write mode the idle time is measured from when (1) the buffer manager apprises the processor that all user data corresponding to the write CDB has been stored in the buffer memory, until (2) the processor is notified that a further write CDB is received on the SCSI bus.

14. The method of claim 11, wherein in a read mode the active transfer time is measured from when (1) the processor, in response to receipt of a read command descriptor block (CDB), initiates a transfer of user data between the SCSI controller and the buffer manager, until (2) the SCSI controller apprises the processor that all user data corresponding to the read CDB has been transferred to the SCSI bus.

15. The method of claim 14, wherein in the read mode the idle time is measured from when (1) the SCSI controller apprises the processor that all user data corresponding to the read CDB has been transferred to the SCSI bus, until (2) the processor is notified that a further read CDB is received on the SCSI bus.

16. The method of claim 11, further comprising determining an average effective transfer rate by averaging the effective transfer rates for a predetermined number of command descriptor blocks (CDBs), including a most recent CDB and a plurality of next previous CDBs.

17. The apparatus of claim 1, wherein the processor dynamically determines both the motion threshold and the reconnect threshold for tic buffer memory.

18. The method of claim 9, further comprising dynamically determining both the motion threshold and the reconnect threshold for the buffer memory.

* * * * *